Figure 1:
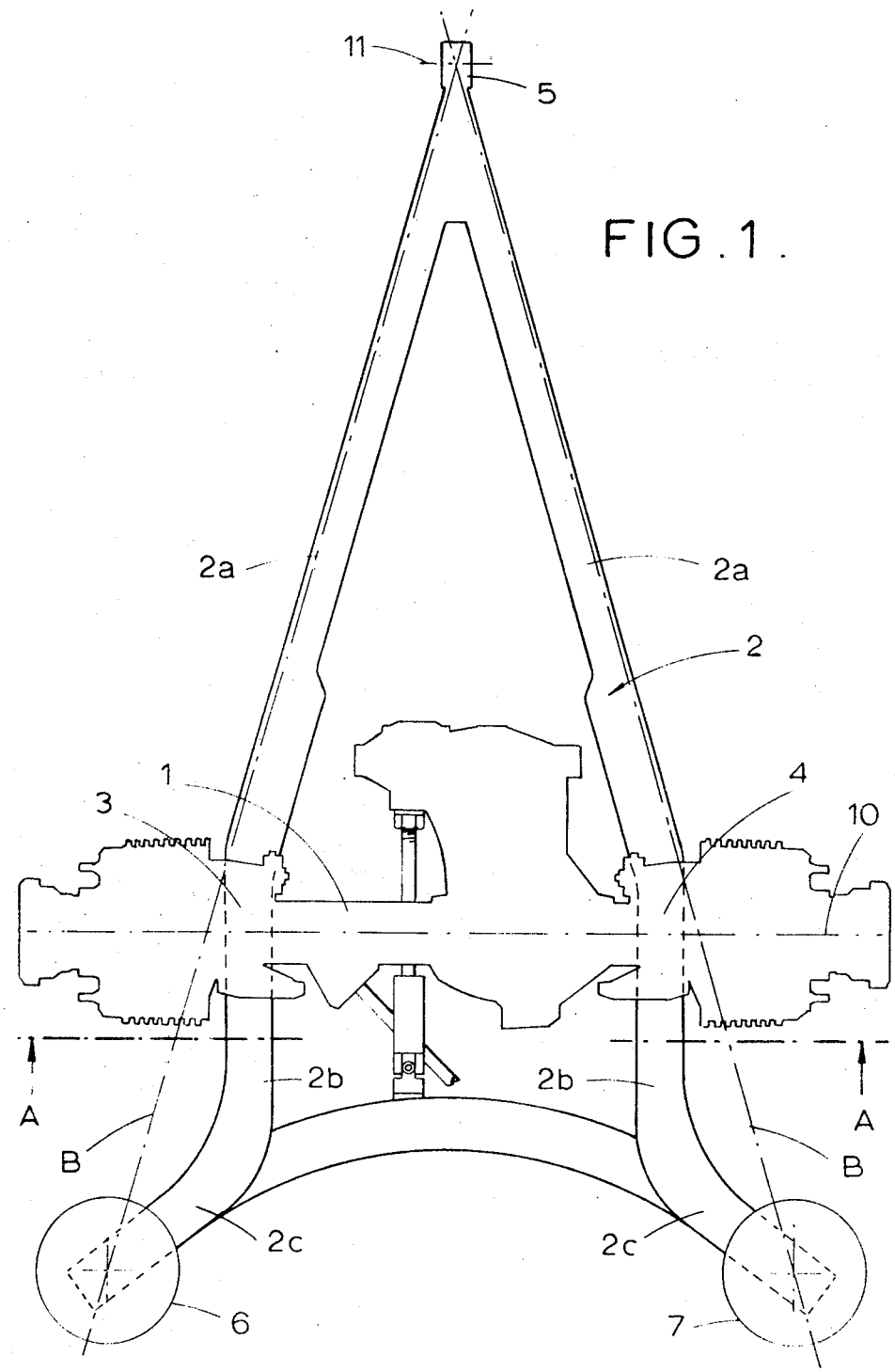

United States Patent [19]
Magleave et al.

[11] 3,744,813
[45] July 10, 1973

[54] MOTOR VEHICLE SUSPENSION
[75] Inventors: James Edward Magleave, Ashton-in-Makerfield; Harold Rushton, New Longton, both of England
[73] Assignee: British Leyland Truck and Bus Division Limited, Leyland, England
[22] Filed: July 2, 1971
[21] Appl. No.: 159,436

[52] U.S. Cl. ............................ 280/124 R, 180/73 R
[51] Int. Cl. ............................................. B60g 9/02
[58] Field of Search .................. 280/124 R; 180/71, 180/73

[56] References Cited
UNITED STATES PATENTS
2,209,457  7/1940  Hare .................................... 180/56
2,369,501  2/1945  Wagner .............................. 180/73 R
1,046,388  12/1912  Hill .................................... 180/73 R Primary Examiner—Philip Goodman
Attorney—Harold T. Stowell, Thomas J. Greer, Jr. et al.

[57] ABSTRACT

A rigid rear axle for a vehicle is located relative to the vehicle by a trailing V-frame pivotedly attached at the apex of the V to the vehicle body. The arms of the V-frame are cranked at their ends and suspension elements, such as air springs, are disposed between the vehicle and the cranked ends. The axle is secured to the V-frame at a point intermediate the apex and the cranked ends.

6 Claims, 2 Drawing Figures

MOTOR VEHICLE SUSPENSION

The present invention relates to motor vehicle suspensions and is more particularly concerned with suspensions of the kind which employ a live axle.

According to the present invention a motor vehicle suspension is characterized by the following features in combination:
  a. a live axle, a V-fame, means rigidly connecting the live axle to the V-frame at an intermediate point along each arm of the V-frame;
  b. means pivotally mounting the apex of the V-frame to a spring mass of the vehicle to allow pivotal movement about a horizontal axis, said apex being forwardly of the arms of the V-frame so that the V-frame is trailing with respect to the direction of movement of the vehicle;
  c. suspension elements interposed between the ends of the arms of the V-frame and the said spring mass of the vehicle; and
  d. the arms of the V-frame being cranked outwardly at their ends so that reaction force applied through the said suspension elements to the arms results in a torsional loading in the arm, which torsional loading acts to oppose bending moments in the axle.

According to a first feature of the invention over a first length the arms of the V-frame diverge from the point at which the apex is pivotedly connected to the sprung mass of the vehicle, over a subsequent length the arms then run parallel to one another and to the longitudinal axis of the vehicle and over a final length the arms again diverge to form the said cranked ends, the suspension elements being interposed between these ends and the sprung mass of the vehicle.

According to a second feature of the invention the two points at which the suspension elements are mounted on the cranked ends are in line with the first lengths of the V-frame arms which diverge from the point at which the apex is pivotedly connected to the sprung mass of the vehicle.

Figure 2:
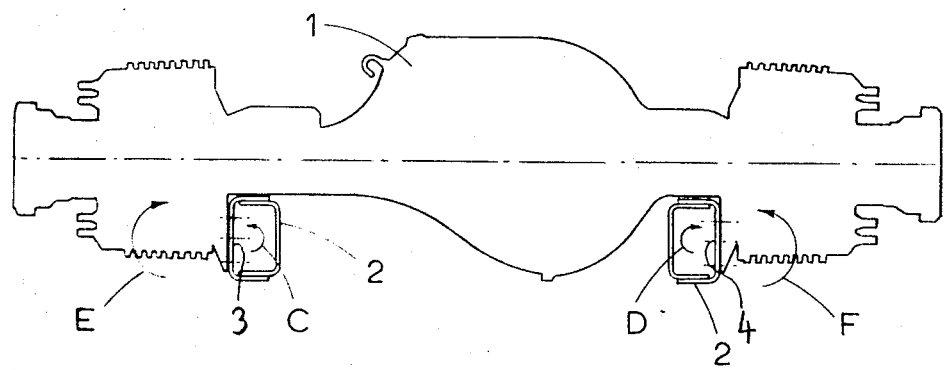

How the invention may be carried out will now be described by way of example only, with reference to the accompanying drawings in which:

FIG. 1 is a plan view of a suspension constructed according to the present invention; and FIG. 2 is a view taken on the line A—A of FIG. 1.

A public service vehicle has a rigid live rear axle 1 having a longitudinal axis 10. The axle is rigidly connected to a V-frame 2, at the positions 3 and 4.

The V-frame is trailing with respect to the vehicle and has its apex pivotedly mounted at 5 to the sprung mass of the vehicle about a horizontal axis 11 which extends normally to the longitudinal axis of the vehicle. Suspension elements in the form of air springs 6 and 7 are interposed between the ends of the arms of the V-frame and the sprung mass of the vehicle.

The arms of the V-frame diverge over first lengths 2a from the mounting point 5, over subsequent lengths 2b the arms extend parallel to one another and to the longitudinal axis of the vehicle, and finally diverge to form cranked ends 2c on which the air springs 6 and 7 are mounted.

The two positions at which the air springs 6 and 7 are mounted on the cranked ends 2c are in line with the two divergent portions 2a respectively as shown by the broken lines B.

The V-frame is shaped so that the bending moment acting on the divergent length 2a is applied on, or close to, the shear center of the open channel section making up the greater part of the length 2a from the apex to subsequent length 2b. The subsequent length 2b and cranked ends 2c are of closed box section.

Reaction forces arising during operation of the vehicle are applied by the air springs 6 and 7 to the cranked ends 2c resulting in an anti-clockwise torsional loading in the lefthand arm as indicated by the arrow C in FIG. 2, and a clockwise torsional stress in the righthand arm as indicated by the arrow D in FIG. 2. These stresses act to reduce bending moments in the axle 1 as indicated by arrows E and F. To this end the axle is attached at points 3, 4 on the outside of the box section of subsequent lengths 2b so that the line of action of forces acting along lines B produces minimal bending moments at the attachment points.

We claim:

1. A motor vehicle suspension having the following in combination:
  a. a live axle, a V-frame, means rigidly connecting the live axle generally transversely to the V-frame at an intermediate point along each arm of the V-frame,
  b. means pivotally mounting the apex of the V-frame to a sprung mass of the vehicle to allow pivotal movement of the V-frame about a horizontal axis, said apex being forwardly of the arms of the V-frame so that the V-frame is trailing with respect to the direction of movement of the vehicle,
  c. suspension elements interposed between the ends of the arms of the V-frame and the said sprung mass of the vehicle,
  d. the arms of the V-frame being cranked inwardly and then outwardly, from said apex, at their ends, whereby reaction forces applied through the suspension elements to the arms results in a torsional loading in the arm, which torsional loading acts to oppose bending moments in the axle.

2. A motor vehicle suspension having the following in combination:
  a. a live axle, a V-frame, means rigidly connecting the live axle generally transversely to the V-frame at an intermediate point along each arm of the V-frame,
  b. means pivotally mounting the apex of the V-frame to a sprung mass of the vehicle to allow pivotal movement of the V-frame about a horizontal axis, said apex being forwardly of the arms of the V-frame so that the V-frame is trailing with respect to the direction of movement of the vehicle,
  c. suspension elements interposed between the ends of the arms of the V-frame and the said sprung mass of the vehicle,
  d. the arms of the V-frame diverging from the apex of the V, then extending parallel to one another and to the longitudinal axis of the vehicle and then over a final length, again diverging to thereby form cranked ends, the said suspension elements being interposed between said cranked ends and the sprung mass of the vehicle.

3. The motor vehicle suspension of claim 2 in which the two points at which the suspension elements are mounted on the cranked ends are in line with the said first-mentioned lengths of the V-frame arms.

4. The motor vehicle suspension of claim 3 is which:
  a. the said parallel lengths of the V-frame are of rectangular cross-section, b. the said live axle is located transversely with respect to the said two parallel lengths and above them, the outer upright walls of the said rectangular sections of the two parallel lengths of the V-frame being secured, respectively, to said live axle.

5. The motor vehicle suspension of claim 1 in which:
a. the arms of the V-frame are rectangular at those portions where the line axle is connected to them, b. the outer upright walls of the said rectangular portions are connected to said line axle.

6. The motor vehicle suspension of claim 1 in which the two points at which the suspension elements are mounted on the cranked ends are in line with the V-frame arms nearest the said apex.

* * * * *